(12) United States Patent
Ashby et al.

(10) Patent No.: US 8,230,629 B2
(45) Date of Patent: Jul. 31, 2012

(54) FACEPLATE ASSEMBLY AND LABEL COVER

(75) Inventors: Robert Ashby, Greensboro, NC (US); Greg Garrett, Lexington, NC (US); Christine Anne Dooley, Lewisville, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 21 days.

(21) Appl. No.: 12/497,909

(22) Filed: Jul. 6, 2009

(65) Prior Publication Data

US 2011/0000115 A1    Jan. 6, 2011

(51) Int. Cl.
*G09F 3/18*         (2006.01)
(52) U.S. Cl. ............................................ 40/661
(58) Field of Classification Search ............... 40/661
See application file for complete search history.

(56) References Cited

U.S. PATENT DOCUMENTS

| | | | |
|---|---|---|---|
| 5,594,206 A | 1/1997 | Klas et al. | |
| 6,172,301 B1 | 1/2001 | Goodsell | |
| 6,421,941 B1 | 7/2002 | Finke et al. | |
| 7,007,422 B2 | 3/2006 | Caveney et al. | |
| 2003/0019732 A1 | 1/2003 | Hunt | |
| 2004/0068907 A1 | 4/2004 | Bazany et al. | |
| 2006/0150458 A1* | 7/2006 | Feroli et al. | 40/661 |
| 2008/0035364 A1 | 2/2008 | O'Young et al. | |

FOREIGN PATENT DOCUMENTS

EP    1 376 802 A1    1/2004

OTHER PUBLICATIONS

Molex Premise Networks; Sep. 7, 1999; 4 pgs.
International Search Report, Internation Application No. PCT/US2010/001807, International Filing Date Jun. 23, 2010.

* cited by examiner

*Primary Examiner* — Lesley D. Morris
*Assistant Examiner* — Kristina Junge

(57) ABSTRACT

A faceplate assembly includes a faceplate body and a label cover. The faceplate body has a front surface and an opposite back side. The front surface includes a panel area and a label area recessed from the front surface. The panel area includes a port extending through the front surface. The label area includes a hinge element. The label cover is coupled to the faceplate body and is disposed in the label area. The label cover includes a hinge protrusion and a retention tab. The hinge protrusion is rotatably coupled to the hinge element to permit the label cover to rotate toward and away from the front surface. The retention tab engages the faceplate body along a perimeter of the label area to secure the label cover in a closed position against the faceplate body.

24 Claims, 3 Drawing Sheets

FACEPLATE ASSEMBLY AND LABEL COVER

BACKGROUND OF THE INVENTION

This invention relates generally to faceplate assemblies, and more particularly, to faceplate assemblies that include labels.

Faceplates are mounted to the exterior surfaces of walls and devices over one or more connectors and/or switches that are mounted behind the faceplates in the walls or devices. The faceplates may include ports that correspond to the connectors and/or switches mounted behind the faceplates. In the case of connectors, mating connectors may be inserted into the ports of the faceplates to mate with the connectors mounted behind the faceplates. The faceplates can be used to provide a more aesthetically pleasing appearance to the connectors and/or switches that are mounted to the walls or devices.

Some known faceplates include labels or indicia on the front surfaces of the faceplates. These labels or indicia may provide information about the connectors and/or switches that are mounted behind the faceplates and/or the mating connectors that are inserted through the faceplates to mate with the mounted connectors. For example, the labels or indicia may describe the particular connectors and/or switches that are mounted behind the faceplate, the data rate at which such connectors communicate information, and the like. In some faceplates, the labels or indicia are printed directly on the front surfaces of the faceplates. But, printing the labels or indicia on the faceplates may limit the use of the faceplates as the connectors mounted behind the faceplates may be changed. For example, the mounted connectors may be swapped out and replaced with different connectors, thereby rendering the labels printed on the faceplates incorrect.

Some other known faceplates include labels or indicia that may be periodically replaced. For example, the faceplates may include labels printed on cards that are inserted into the faceplate. The labels may be removed and replaced if the information printed on the labels is no longer accurate. These faceplates include label covers that are light transmissive elements placed in front of the labels. The labels are located between the label covers and the faceplates. The label covers may be fixed to the faceplate using, for example, screws and other fasteners. But, securing the label covers using screws or fasteners prevents a user from easily and quickly removing the label covers to replace the labels. In environments where the number of labels that need to be replaced or inserted into the faceplates is relatively large, unscrewing or unfastening a large number of screws or fasteners can be a time- and labor-intensive process. Some other label covers are removably coupled with the faceplates. For example, the label covers may be separated from the faceplates in order to replace or insert the labels. But, the label covers may be lost or damaged when removed or separated from the faceplates.

A need exists for faceplates having label covers that may be more easily opened to remove and/or insert labels behind the covers while preventing separation of the label covers from the faceplates.

BRIEF DESCRIPTION OF THE INVENTION

In one embodiment, a faceplate assembly is provided. The assembly includes a faceplate body and a label cover. The faceplate body has a front surface and an opposite back side. The front surface includes a panel area and a label area recessed from the front surface. The panel area includes a port extending through the front surface. The label area includes a hinge element. The label cover is coupled to the faceplate body and is disposed in the label area. The label cover includes a hinge protrusion and a retention tab. The hinge protrusion is rotatably coupled to the hinge element to permit the label cover to rotate toward and away from the front surface. The retention tab engages the faceplate body along a perimeter of the label area to secure the label cover in a closed position against the faceplate body.

In another embodiment, another faceplate assembly is provided. The assembly includes a faceplate body and a label cover. The faceplate body has a front surface and an opposite back side. The front surface includes a panel area and a label area that is recessed from the front surface. The panel area includes a port extending through the front surface. The label cover is rotatably coupled to the faceplate body in the label area to permit the label cover to rotate away from the front surface while retained to the faceplate body. The label cover includes a retention tab that engages the faceplate body to secure the label cover in a closed position. The label cover also includes a recessed area at an interface between the label cover and the faceplate body. The recessed area is configured to receive a tool to disengage the label cover from the faceplate body and to rotate the label cover away from the front surface of the faceplate body.

DETAILED DESCRIPTION OF THE INVENTION

Figure 2:
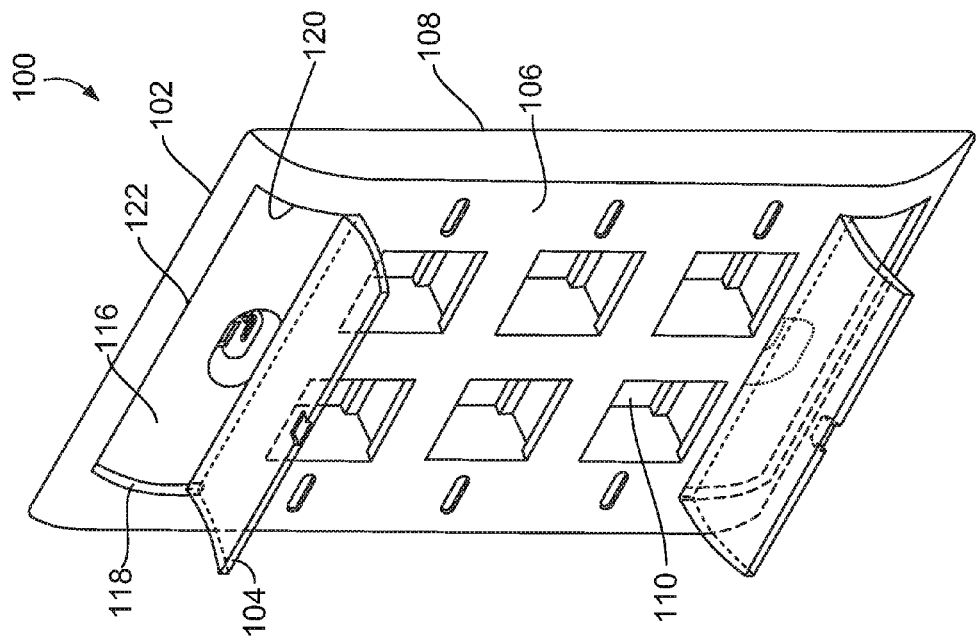
FIG. 2 is a perspective view of an open faceplate assembly in accordance with one embodiment.
Figure 1:
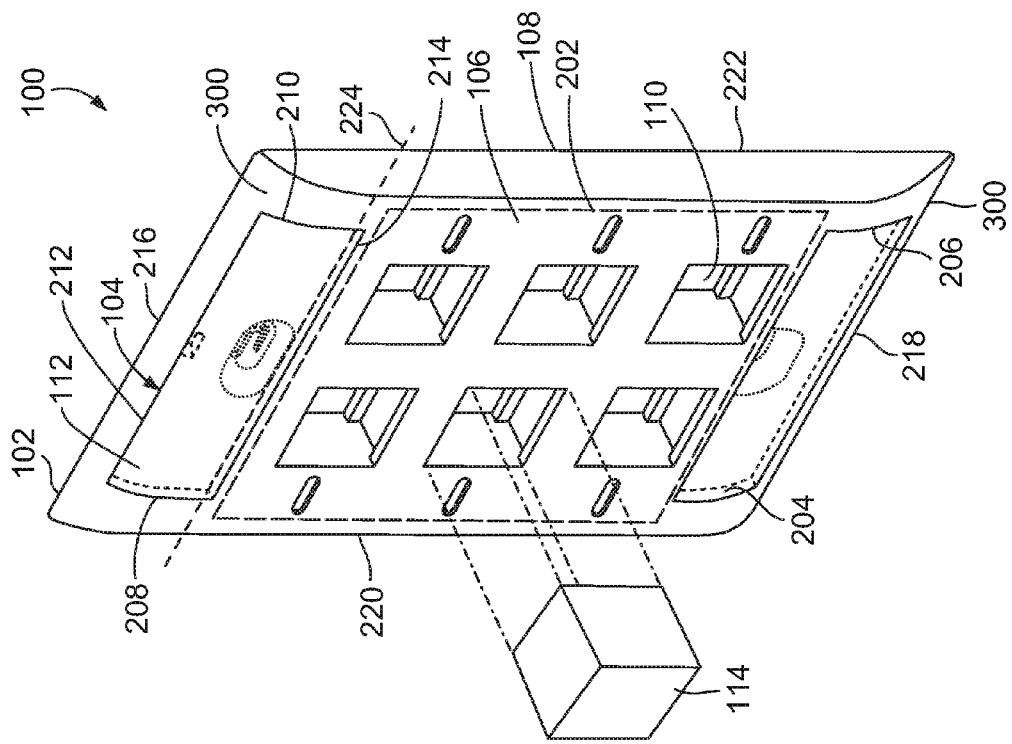
FIG. 1 is a perspective view of a closed faceplate assembly in accordance with one embodiment.

FIG. 1 is a perspective view of a closed faceplate assembly 100 in accordance with one embodiment. FIG. 2 is a perspective view of an open faceplate assembly 100 in accordance with one embodiment. The faceplate assembly 100 includes a faceplate body 102 that is joined with one or more label covers 104. The faceplate body 102 extends from a front surface 106 to an opposite back side 108, between opposite upper and lower edges 216, 218, and between opposite side edges 220, 222. The faceplate body 102 includes label areas 116 and a panel area 202 (shown in FIG. 1). While two label areas 116 and a single panel area 202 are shown in FIG. 2, alternatively, a different number of label areas 116 and/or panel areas 202 may be provided.

In the illustrated embodiment, the faceplate body 102 includes rounded edges extending around the perimeter of the panel area 202. For example, the areas of the front surface 106 of the faceplate body 102 that extend between the panel area 202 and each of the edges 216, 218, 220 (shown in FIG. 2), 222 (shown in FIG. 2) may include rounded surfaces 300 (shown in FIG. 1) that are rounded, or non-planar in shape. In contrast, the panel area 202 may be a substantially planar surface that is not rounded.

The faceplate body 102 includes several ports 110 that extend through the faceplate body 102 in the panel area 202. The ports 110 are configured to receive mating connectors 114 (shown in FIG. 1) and/or provide access to switches that are mounted behind the faceplate body 102 but are accessible through the ports 110. For example, the faceplate assembly 100 may be mounted to a wall or panel (not shown) that includes several connectors and/or switches (not shown) in the wall or panel. The faceplate assembly 100 may cover the connectors and/or switches to provide a more aesthetically pleasing appearance to the wall or panel. Mating connectors 114 may mate with the connectors behind the faceplate assembly 100 through the connector ports 110. The size, shape, quantity, and/or dimensions of the ports 110 may be varied to accommodate a wide variety of mating connectors 114. The mating connector 114 is generically illustrated as a cube to demonstrate that the faceplate assembly 100 may be used in conjunction with a wide variety of mating connectors 114.

The label covers 104 are located in the label areas 116 of the faceplate body 102. The label areas 116 are elongated and extend from one end 204 to an opposing end 206. The label covers 104 also are elongated between opposite ends 208, 210 in one direction and extend between opposite upper and lower edges 212, 214 in a perpendicular direction. In one embodiment, the label covers 104 rotate about a rotation axis 224 that is disposed at or near the lower edge 214 of each label cover 104. Alternatively, the label covers 104 may rotate about a different axis. For example, the label covers 104 may rotate about an axis that extends along one of the ends 208, 210, 212. In the illustrated embodiment, the rotation axes 224 of the label covers 104 are located closer to the panel area 202 than the upper edges 212 of the label covers 104. Alternatively, the rotation axes 224 may be located farther from the panel area 202 than the lower edges 214 of the label covers 104.

The label covers 104 may be used to enclose labels or other indicia between the label covers 104 and the faceplate body 102. For example, a label that includes a description or other information relevant to the connectors and/or switches (not shown) that correspond to the various ports 110 may be placed between one of the label covers 104 and the faceplate body 102. The faceplate body 102 includes label areas 116 behind the label covers 104. The label areas 116 are portions of the faceplate body 102 that are recessed from the front surface 106. The label areas 116 are recessed to receive the labels between the faceplate body 102 and the label covers 104. The label areas 116 form elongated cavities in the faceplate body 102 that extend between opposing ends 118, 120. While to label covers 104 are shown in the illustrated embodiment, alternatively, a different number of label covers 104 may be provided.

The label covers 104 are rotatably coupled to the faceplate body 102 so that the label covers 104 can rotate toward and away from the front surface 106 of the faceplate body 102 without separating the label covers 104 from the faceplate body 102. For example, the label covers 104 may be independently rotated away from the front surface 106 while retaining the label covers 104 to the faceplate body 102. The label covers 104 are shown in a closed position in FIG. 1. The label covers 104 may be rotated away from the front surface 106 to an open position (as shown in FIG. 2) to remove labels from behind the label covers 104 and/or to insert labels behind the label covers 104. The label covers 104 may then be rotated back toward the front surface 106 to the closed position shown in FIG. 1 in order to enclose the labels between the label covers 104 and the faceplate body 102.

In the illustrated embodiment, the label covers 104 (shown in FIG. 1) recede into the faceplate body 102 when the label cover 104 is in a closed position. The label covers 104 may recede into the faceplate body 102 sufficiently far such that the front surfaces 112 of the label covers 104 are flush with the front surface 106 of the faceplate body 102. For example, the label covers 104 may have a rounded shape such that the front surfaces 112 of the label covers 104 may have a rounded shape that is similar or identical to the rounded surfaces 300 of the faceplate body 102. The front surfaces 112 of the label covers 104 may follow the contour of the front surface 106 of the faceplate body 102. The front surfaces 112 of the label covers 104 may be flush with the rounded surfaces 300 of the faceplate body 102 in the areas where the label covers 104 are located, such as, for example, between the panel area 202 and each of the edges 216, 218.

One or more of the faceplate body 102 and the label covers 104 may include, or be formed from, a dielectric material. For example, the faceplate body 102 and the label covers 104 may be separately molded from one or more polymers. Alternatively, the faceplate body 102 may include, or be formed from, a material other than a dielectric material. The label covers 104 are light transmissive bodies. For example, the label covers 104 are formed from one or more materials that permit at least some light to pass through front surfaces 112 of the label covers 104 so that the labels or indicia that is held behind the label covers 104 may be visible through the label covers 104.

Figure 3:
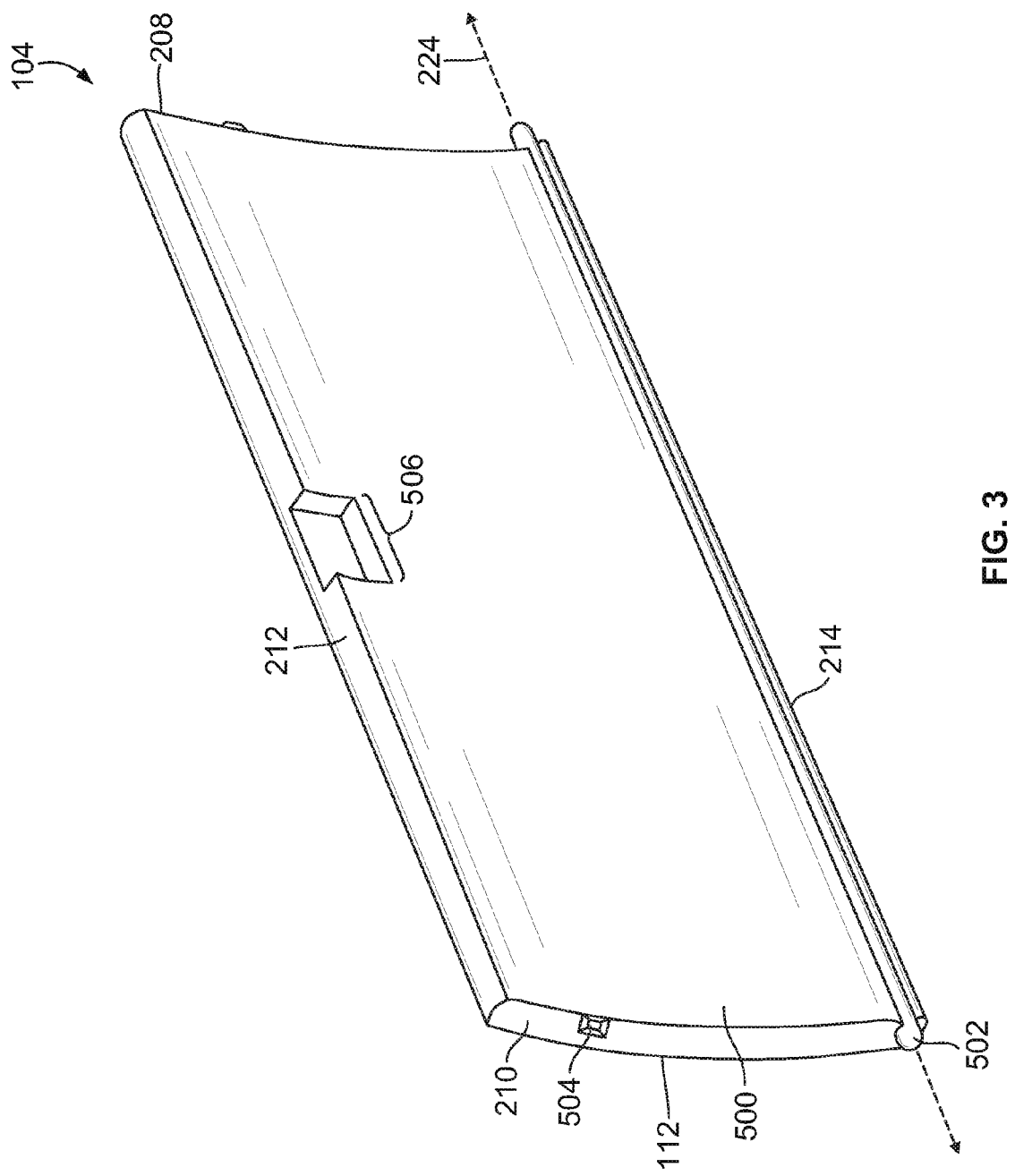
FIG. 3 is a perspective view of a label cover shown in FIG. 1 in accordance with one embodiment.

FIG. 3 is a perspective view of the label cover 104 in accordance with one embodiment. The label cover 104 extends between the front surface 112 and a rear surface 500. The front and rear surfaces 112, 500 may both be convex, rounded shapes. Alternatively, the front surface 112 may have a rounded shape while the rear surface 500 has a different shape, such as a planar shape.

The opposite ends 208, 210 include hinge protrusions 502 that protrude from the ends 208, 210 in opposite directions. Alternatively, only one of the ends 208, 210 includes the hinge protrusion 502. The hinge protrusions 502 are shown as posts that are elongated and oriented along the rotation axis 224 of the label cover 104. The hinge protrusions 502 are received in the faceplate body 102 (shown in FIG. 1) to secure the label cover 104 to the faceplate body 102 while permitting the label cover 104 to rotate about the rotation axis 224 relative to the faceplate body 102.

As shown in FIG. 3, the rotation axis 224 is disposed proximate to the lower edge 214 of the label cover 104. For example, the rotation axis 224 may be located slightly above the lower edge 214 while remaining substantially adjacent to or near the lower edge 214. The lower edge 214 is a rounded edge in the illustrated embodiment. The lower edge 214 may be rounded to permit the label cover 104 to rotate about the rotation axis 224 and avoid interference between the lower edge 214 and the faceplate body 102 during rotation of the label cover 104. Alternatively, the lower edge 214 may be a flat or sharp edge.

The ends 208, 210 include retention tabs 504 that project from the respective ends 208, 210 in opposite directions. Alternatively, a different number of retention tabs 504 may be provided. The retention tabs 504 extend from the ends 208, 210 in directions that are parallel to the rotation axis 224. The retention tabs 504 are set back from the front surface 112 of the label cover 104. For example, the retention tabs 504 may be disposed on the ends 208, 210 in positions that are closer to the rear surface 500 of the label cover 104 than the front surface 112. One or more of the retention tabs 504 may protrude from a different portion of the label cover 104. For example, one or more retention tabs 504 may extend from the upper edge 212.

The label cover 104 includes a recessed area 506 that forms a cavity along the upper edge 212. Alternatively, the recessed area 506 may be located elsewhere, such as along one or more of the opposite ends 208, 210. The recessed area 506 is located at an interface between the label cover 104 and the faceplate body 102 (shown in FIG. 1) when the label cover 104 is in a closed position against the faceplate body 102. The recessed area 506 may be shaped to receive a tool to open the label cover 104. For example, the recessed area 506 may be shaped to receive the end of a screwdriver to pry the label cover 104 away from the faceplate body 102 and rotate the label cover 104 to an open position.

Figure 4:
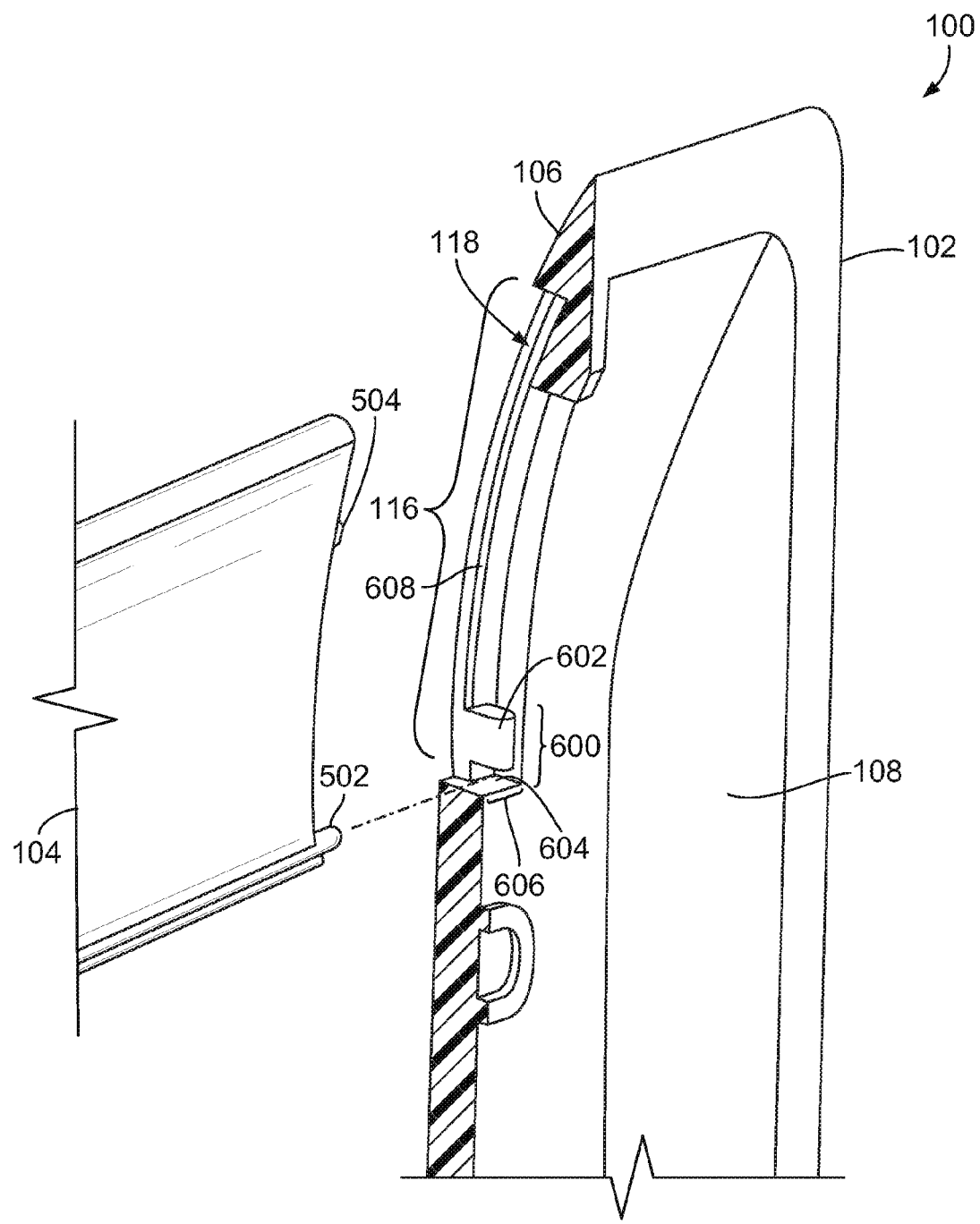
FIG. 4 is a fragmentary and partial cross-sectional view of the faceplate assembly in accordance with one embodiment.

FIG. 4 is a fragmentary and partial cross-sectional view of the faceplate assembly 100 in accordance with one embodiment. The label cover 104 is shown in a fragmentary view while the faceplate body 102 is shown in a fragmentary and cross-sectional view. The faceplate body 102 includes a recess 606 that laterally extends into the faceplate body 102 from the label area 116. The recess 606 extends behind the front surface 106 of the faceplate body 102 to form a cavity behind the front surface 106.

The faceplate body 102 includes a hinge element 600 disposed in the label area 116 along the back side 108 of the faceplate body 102. The hinge element 600 receives the hinge protrusion 502 of the label cover 104 to rotatably couple the label cover 104 to the faceplate body 102. The hinge protrusion 502 is seated in the hinge element 600 to permit the label cover 104 to rotate relative to the faceplate body 102 without separating the label cover 104 from the faceplate body 102. Alternatively, the hinge protrusion 502 may extend from the faceplate body 102 while the hinge element 600 is included in the label cover 104.

In the illustrated embodiment, the hinge element 600 includes a hinge tab 602 and an opening 604. The hinge tab 602 rearwardly extends from the front surface 106 of the faceplate body 102 in the recess 606 toward the back side 108. The opening 604 is formed by the separation between the hinge tab 602 and the faceplate body 102 below the recess 606 along the back side 108 of the faceplate body 102. The hinge protrusion 502 of the label cover 104 is seated in the opening 604 and secured between the hinge tab 602 and the faceplate body 102 in the recess 606. The hinge protrusion 502 is able to rotate within the opening 604 relative to the faceplate body 102 to rotate the label cover 104.

The recess 606 forms a retention ledge 608 behind the front surface 106. The retention ledge 608 extends from the front surface 106 toward the back side 108 along a portion of the perimeter of the label area 116. For example, a different retention ledge 608 may extend along each of the ends 118, 120 (shown in FIG. 2) of the label area 116. Alternatively, the retention ledge 608 may be provided along a different portion of the perimeter for the label area 116. By way of example only, the retention ledge 608 may be located along a top edge 122 (shown in FIG. 2) of the label area 116 that extends between the ends 118, 120. The retention ledge 608 has a thickness dimension that is smaller than a thickness dimension of the faceplate body 102 between the front surface 106 and the back side 108. For example, the retention ledge 608 may be thinner than the faceplate body 102 in locations other than the label area 116.

The retention tab 504 engages the retention ledge 608 to secure the label cover 104 in a closed position. For example, the label cover 104 may be rotated toward the faceplate body 102 until the retention tab 504 contacts the retention ledge 608. As the label cover 104 continues to be rotated toward the faceplate body 102, one or more of the retention tab 504 and the retention ledge 608 may be slightly biased to permit the retention tab 504 to pass the retention ledge 608. The retention tab 504 passes the retention ledge 608 and interlocks the label cover 104 with the faceplate body 102. The retention tab 504 interlocks with the retention ledge 608 when the retention ledge 608 is disposed between the retention tab 504 and the front surface 106 of the faceplate body 102. The interlocking engagement between the retention tab 504 and the retention ledge 608 prevents the label cover 104 from being inadvertently separated or rotated away from the faceplate body 102.

Engagement disengagement between the retention tab 504 and the retention ledge 608 may provide an audible and/or tactile notification to a user of the faceplate assembly 100 that the label cover 104 is secured to the faceplate body 102 in a closed position. For example, when the label cover 104 is rotated toward the faceplate body 102 and the retention tab 504 contacts and snaps past the retention ledge 608, the retention ledge 608 and/or retention tab 504 may make an audible click sound. The engagement between retention ledge 608 and the retention tab 504 also may be felt by a user of the faceplate assembly 100 when the retention tab 504 snaps past the retention ledge 608. The audible and/or tactile notification may be created when the label cover 104 is rotated from the closed position toward the open position. For example, rotating the label cover 104 away from the faceplate body 102 such that the retention tab 504 moves from behind the retention ledge 608 to outside of the faceplate body 102 may create an audible and/or tactile notification to the user that the label cover 104 has been opened. The audible and/or tactile notifications may help to ensure that a user is aware of when the label cover 104 has been snapped back into a closed position against the faceplate body 102 and when the label cover 104 has rotated to an open position.

Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §1102, sixth paragraph, unless and until such claim limitations expressly use the phrase "means for" followed by a statement of function void of further structure.

What is claimed is:
1. A faceplate assembly comprising:
a faceplate body having a front surface and an opposite back side, the front surface including a panel area and a label area recessed from the front surface, the panel area including a port extending through the front surface, the label area elongated between opposing first and second ends, the label area configured to receive a label on the front surface of the faceplate body, the faceplate body including a hinge element having a hinge tab and an opening disposed at the back side of the faceplate body, the hinge tab linearly protruding from the front surface of the faceplate body in a rearward direction away from the front surface and toward the back side of the faceplate body, the opening defined by a space between the hinge tab and an exposed portion of the faceplate body at the first end of the faceplate body; and a label cover coupled to the faceplate body and disposed in the label area, the label cover elongated between opposing ends of the label cover, the label cover including a hinge protrusion and a retention tab, the hinge protrusion received in the opening of the hinge element between the hinge tab and the exposed portion of the faceplate body at the first end of the faceplate body, the hinge protrusion rotatably coupled to the hinge element to permit the label cover to rotate toward and away from the front surface, wherein the retention tab engages the faceplate body along a perimeter of the label area to secure the label cover in a closed position against the faceplate body.

2. The faceplate assembly of claim 1, wherein the label cover is rotatably retained to the faceplate body when the label cover is rotated to an open position.

3. The faceplate assembly of claim 1, wherein the retention tab of the label cover engages the faceplate body at one or more of the opposing first or second ends of the label area.

4. The faceplate assembly of claim 1, wherein the faceplate body includes a retention ledge extending along at least one of the opposing first or second ends of the label area, further wherein the retention tab engages the retention ledge to secure the label cover in the closed position.

5. The faceplate assembly of claim 4, wherein the retention ledge extends from the front surface toward the back side of the faceplate body.

6. The faceplate assembly of claim 4, wherein the retention ledge is thinner than a thickness dimension of the faceplate body along the at least one of the opposing first or second ends of the label area.

7. The faceplate assembly of claim 4, wherein the retention ledge is disposed between the front surface of the faceplate body and the retention tab when the label cover is in the closed position.

8. The faceplate assembly of claim 1, wherein the label cover includes a recessed area at an interface between the label cover and the faceplate body, the recessed area configured to receive a tool to disengage the label cover from the faceplate body and to rotate the label cover away from the front surface of the faceplate body.

9. The faceplate assembly of claim 1, wherein engagement between the label cover and the faceplate body provides at least one of an audible notification or a tactile notification when the label cover is at least one of rotated to the closed position and rotated away from the closed position.

10. The faceplate assembly of claim 1, wherein the label cover includes a rounded lower edge disposed proximate to a rotation axis of the label cover.

11. The faceplate assembly of claim 1, wherein a front surface of the label cover is flush with the front surface of the faceplate body when the label cover is in the closed position.

12. The faceplate assembly of claim 1, wherein the faceplate body extends between opposite edges and the front surface of the faceplate body has a curved shape from the panel area to at least one of the edges.

13. The faceplate assembly of claim 12, wherein the label cover has a rounded shape that follows the curved shape of the front surface of the faceplate body from the panel area to the at least one of the edges.

14. The faceplate assembly of claim 1, wherein the faceplate body includes a recess that laterally extends into the faceplate body from the label area, further wherein the opening of the faceplate body is formed by separation between the hinge tab and the faceplate body below the recess along the back side of the faceplate body.

15. The faceplate assembly of claim 1, wherein the hinge protrusion and the retention tab prevent the label cover from being separated from the faceplate body in a direction oriented from the back side of the faceplate body toward the front surface of the faceplate body.

16. The faceplate assembly of claim 1, wherein the opening of the hinge element of the faceplate body is accessible through the back side of the faceplate body such that the opening receives the hinge protrusion of the label cover through the back side of the faceplate body.

17. A faceplate assembly comprising:
a faceplate body having a front surface and an opposite back side, the front surface including a panel area and a label area recessed from the front surface, the panel area including a port extending through the front surface, the label area elongated between opposing first and second ends, the label area configured to receive a label on the front surface of the faceplate body and including a hinge tab that linearly protrudes from the front surface of the faceplate body in a rearward direction away from the front surface and toward the back side of the faceplate body, the hinge tab defining an opening that extends between the hinge tab and an exposed portion of the faceplate body at the first end of the faceplate body;
a label cover rotatably coupled to the faceplate body in the label area to permit the label cover to rotate away from the front surface while retained to the faceplate body, the label cover elongated between opposing ends, the label cover including a retention tab and a hinge protrusion, the retention tab engaging the faceplate body to secure the label cover in a closed position and a recessed area at an interface between the label cover and the faceplate body, the recessed area shaped to receive a tool to disengage the label cover from the faceplate body and to rotate the label cover away from the front surface of the faceplate body, wherein the hinge protrusion of the label cover is seated in the opening defined by the hinge tab of the faceplate body between the hinge tab and the exposed portion of the faceplate body at the first end of the faceplate body to secure the label cover to the faceplate body.

18. The faceplate assembly of claim 17, wherein the retention tab of the label cover engages the faceplate body at one or more of the opposing first or second ends of the label area.

19. The faceplate assembly of claim 17, wherein the faceplate body includes a retention ledge extending along at least one of the opposing first or second ends of the label area, further wherein the retention tab engages the retention ledge to secure the label cover in the closed position.

20. The faceplate assembly of claim 19, wherein the retention ledge extends from the front surface toward the back side of the faceplate body.

21. The faceplate assembly of claim 19, wherein the retention ledge is thinner than a thickness dimension of the faceplate body along the at least one of the opposing first or second ends of the label area.

22. The faceplate assembly of claim 17, wherein engagement between the label cover and the faceplate body provides at least one of an audible notification or a tactile notification when the label cover is at least one of rotated to the closed position and rotated away from the closed position.

23. The faceplate assembly of claim 17, wherein the faceplate body includes a recess laterally extending behind the front surface of the faceplate body and into the faceplate body from the label area, further wherein the opening is defined by separation between the hinge tab and the faceplate body below the recess along the back side of the faceplate body.

24. The faceplate assembly of claim 17, wherein the opening is defined by separation between the hinge tab and the faceplate body below a recess along the back side of the faceplate body, the opening being accessible through the back side of the faceplate body such that the opening receives the hinge protrusion of the label cover through the back side of the faceplate body.

* * * * *